(12) United States Patent
Cepulonis et al.

(10) Patent No.: US 9,220,253 B2
(45) Date of Patent: Dec. 29, 2015

(54) LOST AND ABANDONED FISHING TACKLE RECOVERY SYSTEM

(71) Applicants: Richard Alan Cepulonis, Bloomingdale, NJ (US); Karen Diane Walters, Bloomingdale, NJ (US)

(72) Inventors: Richard Alan Cepulonis, Bloomingdale, NJ (US); Karen Diane Walters, Bloomingdale, NJ (US)

( * ) Notice: Subject to any disclaimer, the term of this patent is extended or adjusted under 35 U.S.C. 154(b) by 249 days.

(21) Appl. No.: 13/987,589

(22) Filed: Aug. 12, 2013

(65) Prior Publication Data

US 2015/0040328 A1    Feb. 12, 2015

(51) Int. Cl.
| | |
|---|---|
| *A01K 97/24* | (2006.01) |
| *B25J 1/04* | (2006.01) |
| *B25F 1/00* | (2006.01) |
| *B25G 1/04* | (2006.01) |

(52) U.S. Cl.
CPC . *A01K 97/24* (2013.01); *B25F 1/00* (2013.01); *B25G 1/04* (2013.01)

(58) Field of Classification Search
CPC .............. B25F 1/00; A01K 97/24; B25J 1/04; B25G 1/04
USPC ................. 7/106, 158, 161; 43/17.2, 17.5
See application file for complete search history.

(56) References Cited

U.S. PATENT DOCUMENTS

| | | | | | |
|---|---|---|---|---|---|
| 2,879,618 | A | * | 3/1959 | Kirkland, Jr. ................... | 43/17.2 |
| 2,950,558 | A | * | 8/1960 | Karpes ............................ | 43/17.2 |
| 5,070,437 | A | * | 12/1991 | Roberts, Sr. ................... | 362/158 |
| 5,216,828 | A |   | 6/1993 | Langstone | |
| 5,628,538 | A | * | 5/1997 | Ericksen ........................ | 43/17.2 |
| 7,121,038 | B1 | * | 10/2006 | Smith ............................. | 43/17.5 |
| 8,539,711 | B2 | * | 9/2013 | Leuckel ......................... | 43/17.2 |

* cited by examiner

*Primary Examiner* — Hadi Shakeri (57) ABSTRACT

A recovery device comprising a pole with a handle to which length extensions may be mounted. Two top attachments. One for recovering tackle from trees having two longitudinal square shafts with magnets attached to their upper face; said shafts bending vertically toward a square attachment front side with magnets attached to the face thereof with razor points at the tips; a flashlight mounted on its underbelly and a back attachment mounted horizontally having a fibrous sheet for securing tackle during retrieval. A second underwater attachment comprising a stem with the top of the stem having a vertical round shaft protruding from its center; a magnet mounted on the bottom side of said vertical face of the round shaft extending from the face of the shaft rearward along the bottom side, with a magnet mounted on the front face and a split ring attached to the top of the face extending vertically.

1 Claim, 7 Drawing Sheets

LOST AND ABANDONED FISHING TACKLE RECOVERY SYSTEM

This application claims the benefit of provisional patent application Ser. No. 61/764,427, filed 2013 Feb. 13 by the present inventors.

FEDERALLY SPONSORED RESEARCH not applicable.

THE NAMES OF THE PARTIES TO A JOINT RESEARCH AGREEMENT not applicable.

SEQUENCE LISTINGS OR PROGRAM not applicable.

BACKGROUND

Prior Art

The following is a tabulation of prior art that presently appears relevant:

| U.S. Patents | | |
|---|---|---|
| Pat. No. | Issue Date | Patentee |
| 5,216,828 | 1993 Jun. 8 | Langstone |

Many if not most fishermen loose fishing lures, hooks, sinkers and floats that become tangled in above-water obstacles such as trees and on underwater obstacles while fishing. Inventors in the past have created various devices in an attempt to address this problem. The most recent innovation, now expired U.S. Pat. No. 5,216,828 to Langstone in 1992 discloses a retrieving device comprising a pole with a handle to which length extensions may be mounted. A top attachment which can be mounted for retrieval of tackle from trees and above water obstacles having a cusp section with two elongated shafts which bend perpendicularly having angular grooves on the inside and outside for securing line during retrieval and a vertical back attachment for securing hooks, but nevertheless all of the devices heretofore known suffer from a number of disadvantages:

(a) None of the previous devices utilizes magnets attached to the face of the elongated shafts and perpendicular shafts to secure fishing lures and hooks during retrieval to prevent their loss into bodies of water, as does our improvement invention described herein. Compare "Langstone", supra.

(b) None of the previous devices utilizes a built in waterproof flashlight to illuminate tree branches and underwater obstacles for night recovery as does our improvement invention described herein. Compare "Langstone", supra.

(c) None of the previous devices utilize razor edged blades at the ends of their perpendicular shafts to cut loose fishing line that has become tangled on tree branches, as does our improvement invention described herein. Compare "Langstone", supra.

(d) None of the previous devices utilizes square appendages with externally raised protruding grooves to secure fishing line during retrieval as does our improvement invention described herein. Compare "Langstone", supra.

(e) None of the previous devices utilizes a flat back pad to secure lures during recovery and still be able to view the elongated shafts which bend perpendicularly, as does our improvement invention described herein. Compare Langstone with vertical back attachment which obscures view of the elongated shafts and perpendicular shafts, and thus the recovery target as well.

SUMMARY

In accordance with the present invention, two embodiments of a fishing tackle recovery system comprises a linearly extendable pole and a mountable head with a longitudinal stem with two longitudinal square shafts protruding from the top of said stem with magnets affixed to their upper faces which bend vertically toward a square attachment front side with magnets attached to the face thereof and a back attachment mounted horizontally, said back attachment having a fibrous sheet, a waterproof flashlight mounted on the underbelly of the longitudinal stem, and cutter blades at the tips of the vertical front side appendages; and an underwater fishing tackle recovery system comprises a linearly extendable pole and a mountable head with a stem having a round shaft protruding from its center and a magnet mounted on the bottom side of said round shaft which extends from the face of the round shaft rearward along the bottom side, and a magnet mounted horizontally on the face of said round shaft, and a slip ring attached at the top of the face extending vertically, with a waterproof flashlight mounted on the underbelly of the stem.

DRAWINGS

Figures

In the drawings, closely related figures have the same part reference numbers. Parts that are unequally different have different stated reference numbers.

REFERENCE NUMBERS 1. hollow based connecter flange
2. hole
3. stem
4. flat horizontal pad covered with fiber 5a. Square vertical member
5b. square vertical member
6a. Externally mounted angular grooves on outside of square vertical member
6b. Externally mounted angular grooves on outside of square vertical member
7a. Attached magnet
7b. Attached magnet
7c. Attached magnet
7d. Attached magnet
8a. Flat point
9. retaining nut
10. mounted flashlight
11a. mounted blade
11b. mounted blade
12. slip ring
13. magnet on face
14. flat magnet
15. pole connector locking button
16. extension pole section
17a. square magnet
17b. Square magnet

DETAILED DESCRIPTION—FIGS. 1,2,3,4—FIRST EMBODIMENT ABOVE-WATER RECOVERY SYSTEM—ALTERNATIVE EMBODIMENT

Figure 1:
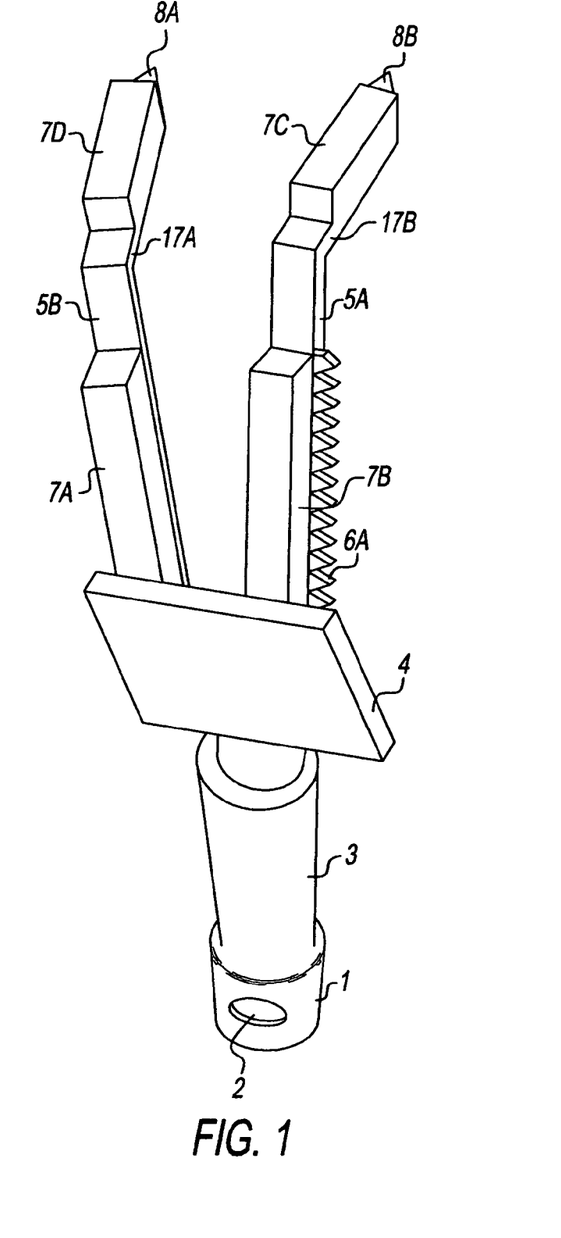
FIG. 1 is a top perspective view showing an alternative embodiment of the above-water attachment.

FIG. 1 Shows a perspective view of the above-water attachment designed for retrieving lures and other fishing tackle from trees and other shoreline obstacles. This alternative embodiment has a hollow based connecter flange 1 at the base with a hole 2 for attaching to an extension pole section 16 and securing by means of a pole connecter locking button 15. A stem 3, and protruding therefrom two square vertical members 5a and 5b; and mounted between said square vertical members, a flat horizontal pad covered with fiber material 4. Its purpose is to secure and retain during retrieval lures and hooks which are caught and lodged in its structure so that they will be retained during retrieval. This pad is secured to the two square vertical members by means of a retaining nut 9 which connects to a retaining bolt built into the base of the horizontal pad (see FIG. 3). Mounted on the top of the two square vertical members are magnets 7a and 7b designed to hold fishing hooks and lures during retrieval. On the outsides of the two square vertical members are externally mounted angular grooves 6a and 6b designed to secure fishing line which has wrapped around the two square vertical members during recovery. The ends of the two square vertical members bend horizontally 17a and 17b. Mounted on the two horizontal members are magnets 7c and 7d designed to hold fishing lures and hooks during retrieval. The two horizontal members have alternative flat points 8a and 8b at their ends designed for scraping tangled fishing line from tree branches to aid in recovery.

Figure 2:
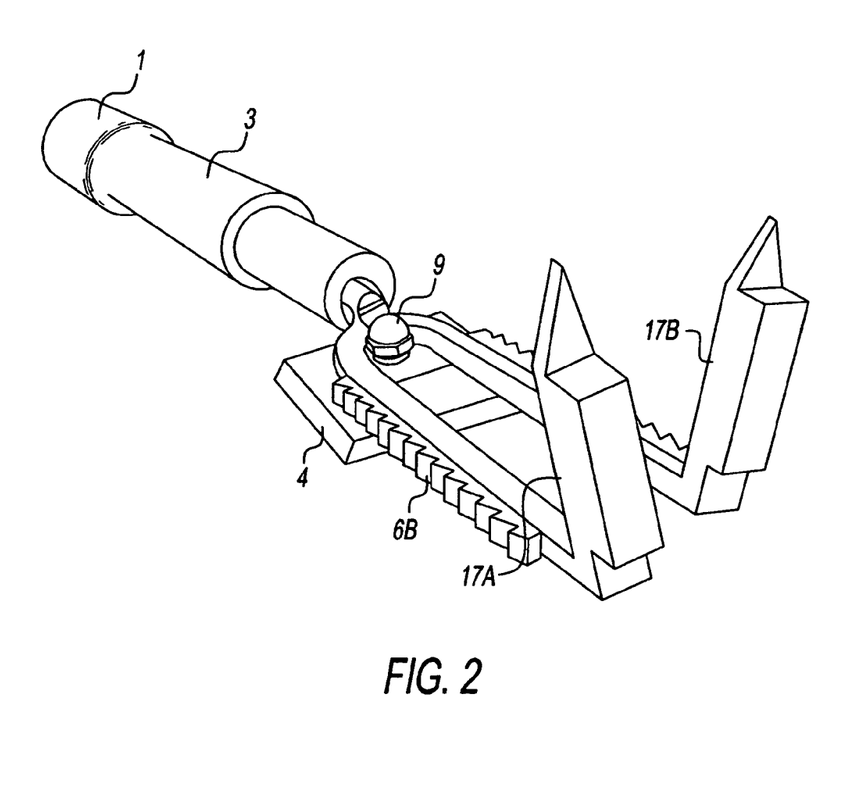
FIG. 2 is a bottom perspective view showing an alternative embodiment of the above-water attachment.

FIG. 2 Shows a bottom perspective view of the above-water attachment designed for retrieving lures and other tackle from trees and other shoreline obstacles. It shows the pad retainer bolt 9, the two square horizontal members 17a and 17b, and the externally mounted angular grooves on the outside of the left side 6b of square vertical member 5b not visible in FIG. 1.

Figure 3:
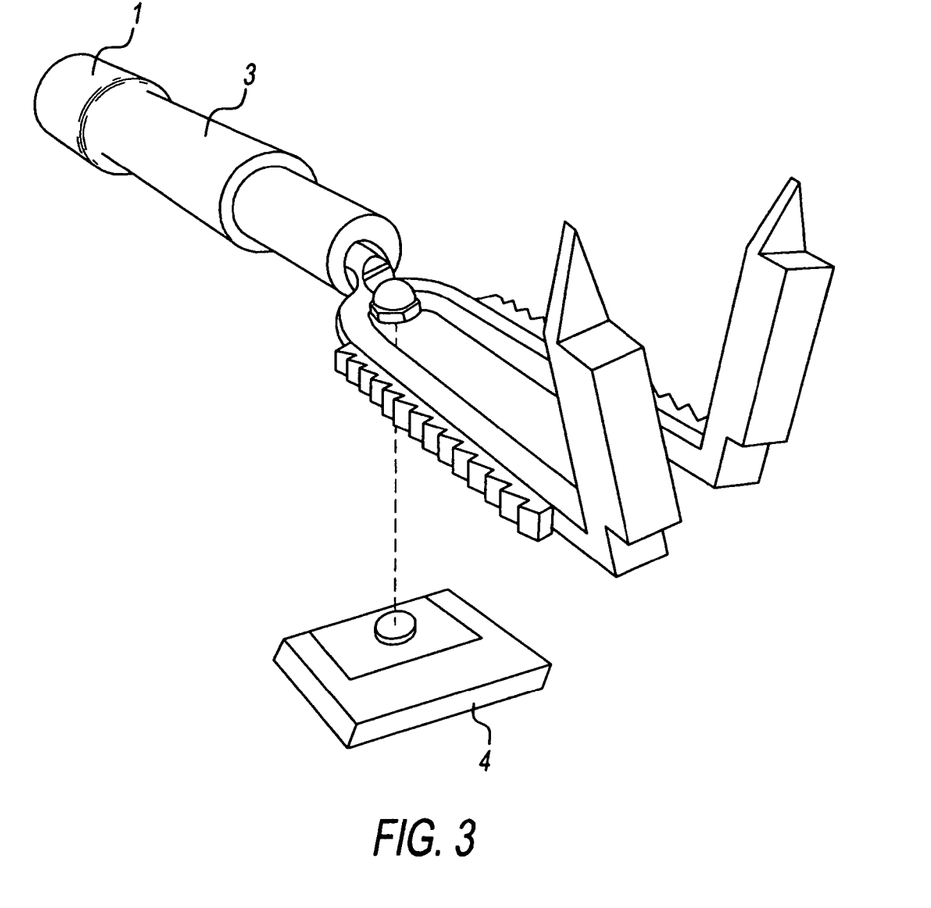
FIG. 3 is a bottom perspective view showing an alternative embodiment of the above-water attachment with a suspended view of the back attachment.

FIG. 3 Shows a bottom perspective view of the above-water attachment with a suspended view of the flat horizontal pad covered with fiber 4, which is designed to be secured by means of a retaining nut 9.

Figure 4:
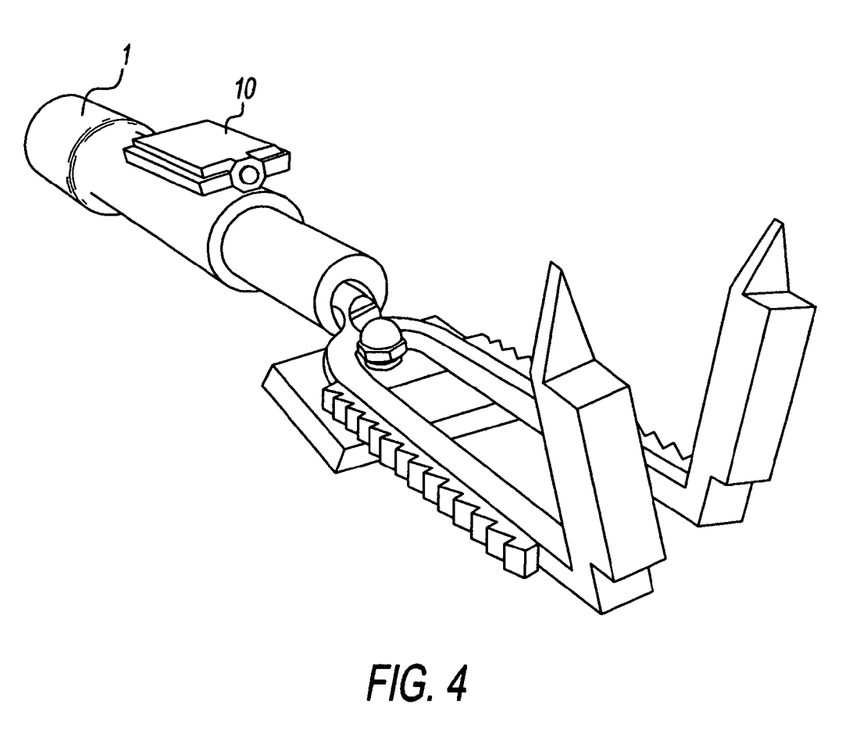
FIG. 4 is a bottom perspective view showing an alternative embodiment of the above-water attachment with a waterproof flashlight mounted on its underbelly.

FIG. 4 Shows the bottom perspective view of the above-water attachment with a waterproof flashlight mounted on its underbelly. The purpose of the flashlight is to illuminate lures and other fishing tackle tangled in trees for recovery at night or in cloudy weather.

Figure 5:
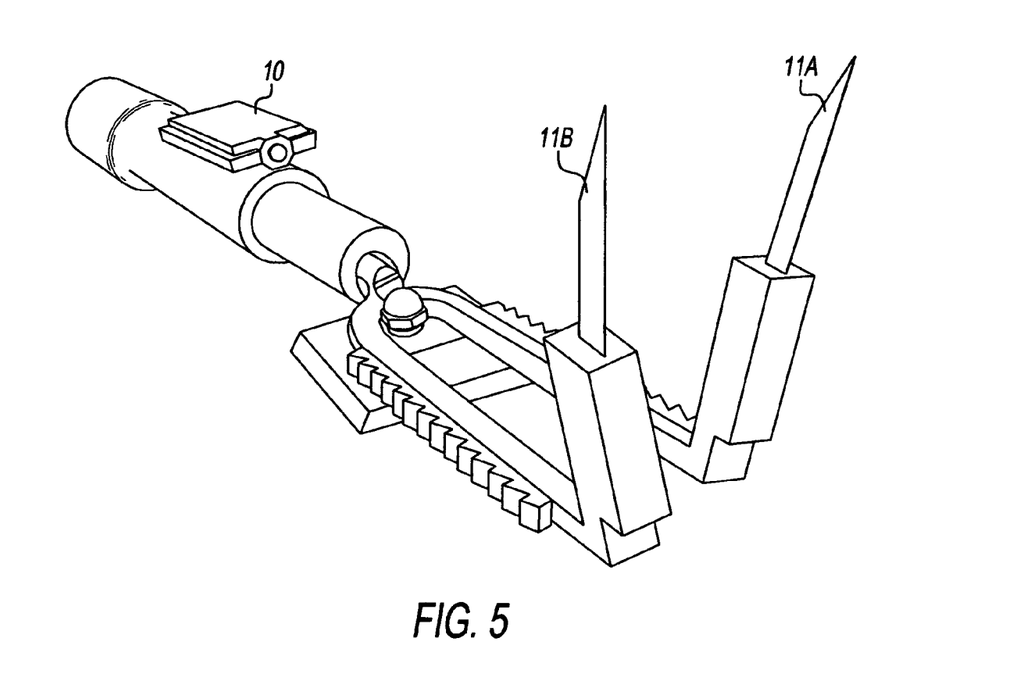
FIG. 5 is a bottom perspective view showing a preferred embodiment of the above-water attachment with a water proof flashlight mounted on its underbelly, and straight blades mounted on its tips in place of flat points.

FIG. 5 Second Embodiment—Preferred Embodiment shows a bottom perspective view of the above-water attachment with a waterproof flashlight mounted on its underbelly with straight blades mounted on its forward tips in place of flat points. The purpose of the straight blades is to cut tangled fishing line from tree branches upon which it has become tangled.

Figure 6:
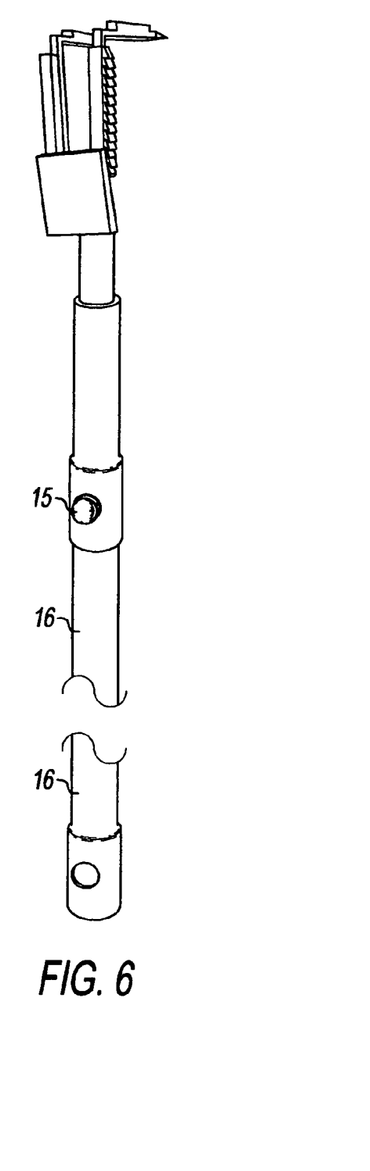
FIG. 6 shows a perspective view of the assembled device.

FIG. 6 Shows a perspective view of the assembled fishing tackle recovery device with a single extension section according to the preferred embodiment of the invention. The invention utilizes a plurality of elongated extension members of equal length, which may be attached as required.

Figure 7:
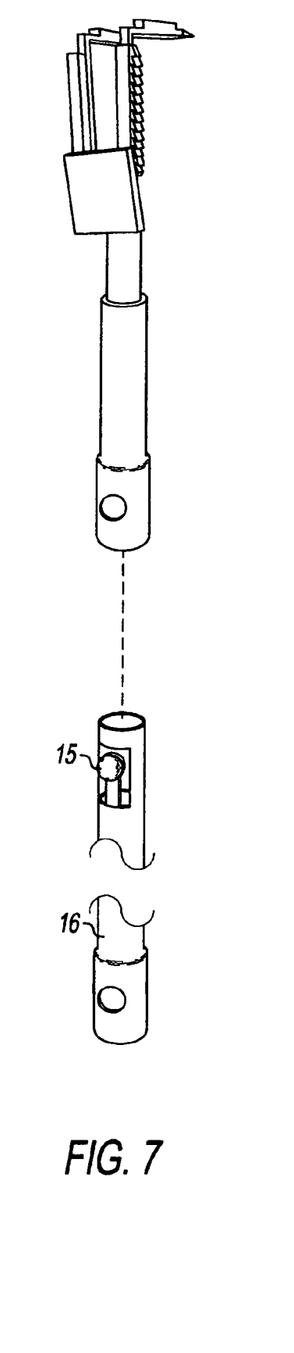
FIG. 7 shows a perspective view of the disassembled device and an extension pole.

FIG. 7 Shows a perspective view of the disassembled fishing tackle recovery device with push button locking device visible according to the preferred embodiment of the invention. The base section comprising a pole 16 manufactured from a durable, rigid material with a hollow based connecter flange 1 at its base which contains a hole 2 into which the pole connecter locking button 15 is secured.

Figure 8:
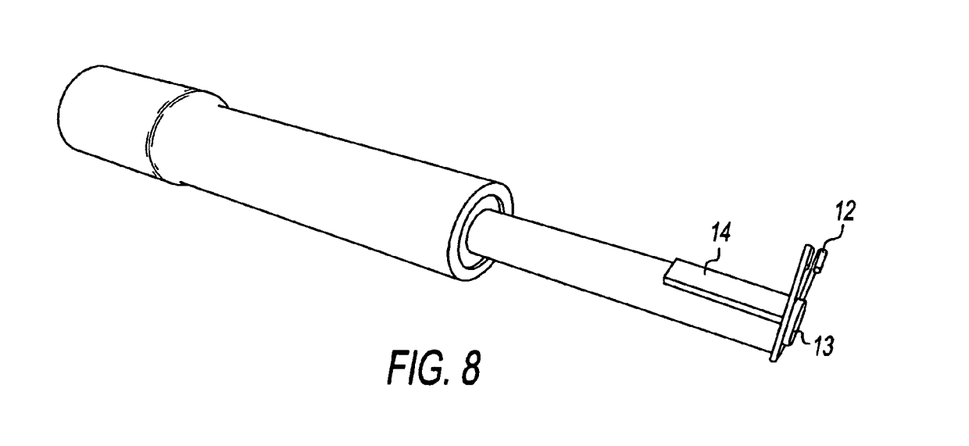
FIG. 8 is a bottom perspective view showing a preferred embodiment of the under-water attachment.
Figure 9:
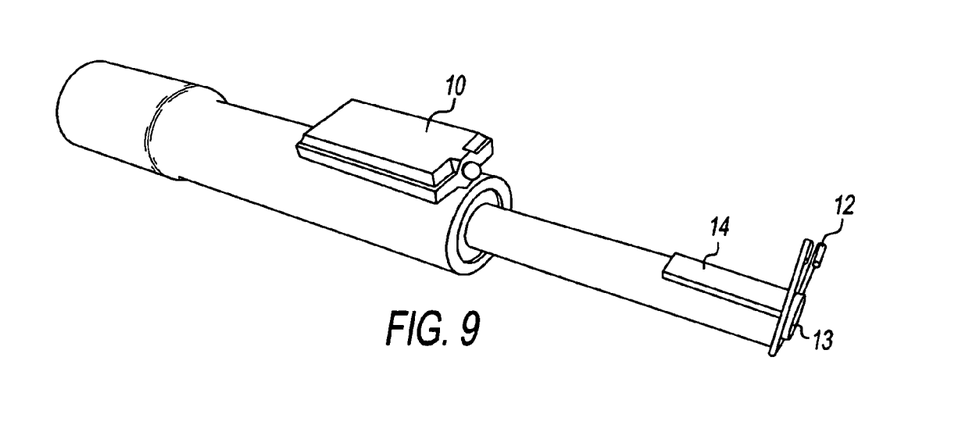
FIG. 9 is a bottom perspective view showing a preferred embodiment of the under-water attachment with a waterproof attachment mounted on its underbelly.

FIGS. 8 and 9—Third Embodiment—Preferred Embodiments

FIG. 8 Shows a bottom perspective view of the split ring attachment designed for recovering fishing lures from underwater obstacles upon which they have become lodged during retrieval. This preferred embodiment has a hollow based connecter flange 1 at its base, with a hole 2 on its upper face 2 (not shown) in which to secure an extension pole connecter lock button 15. On the bottom face of the stem is mounted a magnet 14 for securing fishing lures or hooks during retrieval and above the magnet is a split ring 12 for directing and securing fishing line during retrieval. At the very tip of the stem is mounted a magnet 13 for retaining fishing lures and hooks during retrieval.

FIG. 9 Shows a bottom perspective view of a preferred split ring attachment with a waterproof flashlight 10 mounted on its underbelly for viewing lodged lures underwater in the dark during recovery.

In describing the preferred embodiments of the invention, which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

Operation—FIGS. 1,2,3,4,5,6 and 7

This device will perform a number of fishing tackle recovery functions above-water to recover lures and other fishing tackle which have become tangled in tree branches and abandoned. To retrieve a fishing lure or other fishing tackle from a tree branch on which it has become lodged, the user must connect the above-water recovery attachment (FIGS. 1,2,3,4, and 5) to a series of pole sections sufficient to reach the lost tackle. This is accomplished by connecting the series of poles and recovery head using the push button connecting device. By compressing the push button locking device at the top of the pole section and inserting the top of the pole section into the base of the recovery head until the push button pops out of the retaining hole securely locking the sections together, then attaching additional pole sections by inserting the top of a n extension pole into the base of a previous pole until the push button pops out of the retaining hole securely locking the pieces together (FIG. 6). Once sufficient height is attained to reach the lost fishing tackle the assembled unit is then raised by the base pole to reach the item of tackle which has become tangled on the tree branch. If the hooks of a lure are tangled on the tree branch the flat points at the end of the device may be used to rake the hooks free from the branch, or in the use of the head with the razor blade edges (FIG. 5) the fishing line may be cut with a forward stroke of the blades over the snagged fishing line. Once the hooks are loose from the branch and the lure is hanging by its line from the branch, the magnets on the face of the recovery device can be used to secure the hooks or metal lure during retrieval, or the back attachment (FIG. 1) can be used to secure the hooks into the pad, thus preventing the lure from falling into the water during retrieval and becoming lost. As an alternative, the fishing line and tackle hanging from the tree may be wound around the two appendages of the recovery head with a turning motion of the pole assembly and the line will stay wrapped around the appendages through utilization of the grooves mounted on the outside of the appendage. The recovery pole may then be tugged causing the fishing line to break or become dislodged from the obstacle or the square vertical members (5a and 5b) may be placed around the tree branch and the branch snapped and broken with a turn of the recovery pole unit at its base. Branches with fishing tackle will float if they fall into the water once the branch has been broken off of the tree. This tackle can easily be retrieved by utilizing the recovery head to lift the branch out of the water, by turning the recovery head up side down and placing it under the floating branch or tackle. For night recovery efforts the waterproof flashlight 10 may be used. One need only turn the flashlight on or off as needed to illuminate lost tackle lodged on tree limbs, etc.

Underwater Recovery Attachment Operation

This device can be used to free and retrieve lures which have become lodged on obstacles in bodies of water. In this case the user would attach the underwater recovery head (FIGS. 8 and 9) to a series of pole sections, as previously explained above, sufficient to reach the snagged tackle using the push button connecting device. By compressing the push button locking device and inserting the top of the pole section into the base of a prior pole until the push button pops out of the retaining hole securely locking the poles together. The snagged fishing line at the end of the fishing pole should then be slid through the opening between the two sides of the slip ring. With one hand holding the fishing line the recovery pole should be directed forward to the point where the lure is lodged underwater. Once the end of the recovery pole slip ring attachment has reached the lure, the lure can then be dislodged by a forward thrust of the recovery pole assembly. The freed lure or its hooks will be secured during recovery by the magnets (13 and 14) on the face and underbelly of the recovery head (FIG. 8) or the lure can be retained at the top of the snap ring assembly by simply holding the fishing line tightly while withdrawing the recovery pole unit from the water. The same result can be accomplished from either a shore line location or a boat. For night lure recovery the waterproof flashlight (FIG. 9) mounted on the underbelly of the underwater recovery attachment may be utilized. One need only turn the flashlight on or off as needed to illuminate lost lures during recovery.

Conclusion, Ramifications and Scope

Accordingly, the reader will see from the description above, a number of advantages of the embodiments of our improved fishing tackle recovery system are evident over those illustrated in the prior art:

(a) Our flat back pad construction does not interfere with above-water tackle recovery because it does not obstruct the view of the tackle sought to be recovered, as is the case of the back pad of the "Langstone", supra device;

(b) The magnets on the face of the two square appendages of our above-water fishing tackle recovery device secure lures and hooks during recovery, and are an improvement over prior art ("Langstone") which has no magnets to secure lures and hooks during recovery to prevent loss;

(c) Our cutting blade tips on our above-water recovery system mountable head are an improvement over prior art ("Langstone") because they provide a simplified and more efficient way to remove tangled fishing line from tree limbs and branches and free tangled fishing tackle thus eliminating the need to break and remove branches from trees to recover tangled tackle;

(d) Our waterproof flashlight mounted on the underbelly of our above-water fishing tackle recovery system illuminates lost tackle for night recovery, an improvement not found in prior art (See "Langstone", supra);

(e) Magnets on the face and underbelly of the underwater recovery device stem to secure hooks and lures during retrieval (FIG. 8) are an improvement over prior art, where no such feature has ever been claimed previously;

(f) The waterproof flashlight mounted on the underbelly of the underwater recovery device to illuminate lost lures for night recovery (FIG. 9) is an improvement over prior art, where no such feature has ever been claimed.

Although the description above contains many specificity, these should not be construed as limiting the scope of the embodiments but as merely providing illustrations of some of several embodiments. Thus the scope of the embodiments should be determined by the appended claims and their legal equivalents, rather than by the examples given.

We claim:
1. A lure and fishing tackle recovery kit comprising:
a linearly extendable pole;
an above-water recovery device comprising:
   a first attachment having a longitudinal stem, two square shafts protruding longitudinally from an end of said stem with each having a magnet affixed to an upper face thereof, each of the shafts bending downwardly toward a front tip with each having a magnet attached to a face thereof, and a back attachment mounted on the protruding longitudinally shafts to extend longitudinally along the shafts, said back attachment having a fibrous sheet and means for securing said back attachment to the shafts, the first attachment further including a cutter blade on each of said front tip;
an underwater recovery device comprising:
   a second attachment having a longitudinal stem, a round shaft protruding longitudinally from an end of the stem, a magnet mounted on a side of said round shaft extending longitudinally, another magnet mounted on an end face of said round shall; and a slip ring attached to the shaft adjacent said end face extending normal to said round shaft;
a waterproof flashlight mounted on either or both of the first and second attachments; and
means for securing either of said attachments to one end of said linearly extendable pole.

* * * * *